(12) United States Patent
Shemesh et al.

(10) Patent No.: US 12,401,580 B2
(45) Date of Patent: *Aug. 26, 2025

(54) SYSTEM AND METHOD FOR GENERATION OF UNIFIED GRAPH MODELS FOR NETWORK ENTITIES

(71) Applicant: Wiz, Inc., New York, NY (US)

(72) Inventors: Daniel Hershko Shemesh, Givat-Shmuel (IL); Liran Moysi, Kfar Saba (IL); Roy Reznik, Tel Aviv (IL); Shai Keren, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/409,371

(22) Filed: Jan. 10, 2024

(65) Prior Publication Data

US 2024/0163187 A1    May 16, 2024

Related U.S. Application Data

(63) Continuation of application No. 17/161,190, filed on Jan. 28, 2021, now Pat. No. 11,929,896.

(51) Int. Cl.
| | |
|---|---|
| *H04L 43/045* | (2022.01) |
| *G06F 16/901* | (2019.01) |
| *H04L 43/08* | (2022.01) |
| *H04L 67/10* | (2022.01) |

(52) U.S. Cl.
CPC ........ *H04L 43/045* (2013.01); *G06F 16/9024* (2019.01); *H04L 43/08* (2013.01); *H04L 67/10* (2013.01)

(58) Field of Classification Search
CPC ....... H04L 43/045; H04L 43/08; H04L 67/10; G06F 16/9024
See application file for complete search history.

(56) References Cited

U.S. PATENT DOCUMENTS

| | | | |
|---|---|---|---|
| 5,586,254 A | 12/1996 | Kondo et al. | |
| 5,819,028 A | 10/1998 | Manghirmalani et al. | |
| 5,926,462 A | 7/1999 | Schenkel et al. | |
| 9,137,110 B1 * | 9/2015 | Adogla | H04L 41/145 |
| 9,800,470 B2 | 10/2017 | Agarwal et al. | |
| 9,843,485 B2 * | 12/2017 | Desai | H04L 43/12 |

(Continued)

OTHER PUBLICATIONS

"Nodes" Arizona.edu. Retrieved Jun. 19, 2025, from https://hpcdocs.hpc.arizona.edu/software/containers/what_are_co.

(Continued)

*Primary Examiner* — Michael Won
(74) *Attorney, Agent, or Firm* — M&B IP Analysts, LLC

(57) ABSTRACT

A system and method for generation of unified graph models for network entities are provided. The method includes collecting, for at least one network entity of a plurality of network entities, at least one network entity data feature, wherein the at least one network entity data feature is a network entity property; genericizing the collected at least one network entity; generating at least a network graph, wherein the generated network graph is a multi-dimensional data structure providing a representation of the plurality of network entities and relations between the network entities of the plurality of network entities; and storing the generated at least a network graph.

28 Claims, 8 Drawing Sheets

(56) References Cited

U.S. PATENT DOCUMENTS

| | | | |
|---|---|---|---|
| 10,009,251 | B1 | 6/2018 | Koster et al. |
| 10,326,673 | B2 | 6/2019 | Kulshreshtha et al. |
| 10,447,553 | B2 | 10/2019 | Biran et al. |
| 10,862,928 | B1 | 12/2020 | Badawy et al. |
| 10,992,543 | B1* | 4/2021 | Rachamadugu .... H04L 41/0853 |
| 11,086,709 | B1* | 8/2021 | Ratkovic ............... G06F 11/079 |
| 11,159,366 | B1 | 10/2021 | Gawade et al. |
| 11,175,939 | B2 | 11/2021 | Kumatagi et al. |
| 11,863,580 | B2 | 1/2024 | Ross et al. |
| 2002/0147715 | A1 | 10/2002 | Beyer |
| 2003/0101251 | A1* | 5/2003 | Low ........................ H04L 41/20 709/223 |
| 2004/0210654 | A1 | 10/2004 | Hrastar |
| 2007/0147269 | A1 | 6/2007 | Ettle et al. |
| 2008/0312898 | A1* | 12/2008 | Cleary .................. H04L 69/329 703/21 |
| 2010/0223295 | A1 | 9/2010 | Stanley et al. |
| 2010/0241698 | A1* | 9/2010 | Hillerbrand ............. G06F 16/13 707/813 |
| 2013/0219009 | A1 | 8/2013 | Bheemarajaiah et al. |
| 2014/0130008 | A1 | 5/2014 | Amulu |
| 2015/0200867 | A1* | 7/2015 | Dutta .................. H04L 41/0896 709/226 |
| 2016/0019033 | A1 | 1/2016 | Ebner et al. |
| 2016/0103706 | A1* | 4/2016 | Novaes .................. G06Q 10/10 718/102 |
| 2016/0105350 | A1 | 4/2016 | Greifeneder et al. |
| 2016/0219117 | A1 | 7/2016 | Marlatt et al. |
| 2016/0352766 | A1 | 12/2016 | Flacher et al. |
| 2017/0127427 | A1 | 5/2017 | Claridge et al. |
| 2017/0140040 | A1 | 5/2017 | Gottemukkala et al. |
| 2017/0279698 | A1* | 9/2017 | Sartran ............... H04L 43/0876 |
| 2017/0310552 | A1* | 10/2017 | Wallerstein ............. H04L 41/22 |
| 2018/0024981 | A1 | 1/2018 | Xia et al. |
| 2018/0063193 | A1 | 3/2018 | Chandrashekhar et al. |
| 2018/0196685 | A1* | 7/2018 | Dorr .................... G06F 9/45558 |
| 2018/0261001 | A1 | 9/2018 | Wang et al. |
| 2019/0171474 | A1* | 6/2019 | Malboubi ........... H04L 61/5007 |
| 2019/0190778 | A1 | 6/2019 | Easterling et al. |
| 2019/0258756 | A1 | 8/2019 | Minwalla et al. |
| 2019/0258973 | A1 | 8/2019 | Prabhu et al. |
| 2019/0289038 | A1 | 9/2019 | Li et al. |
| 2019/0391554 | A1* | 12/2019 | Huang ................. G05B 19/182 |
| 2020/0050689 | A1 | 2/2020 | Tal et al. |
| 2020/0167642 | A1 | 5/2020 | Dhurandhar et al. |
| 2020/0236038 | A1 | 7/2020 | Liu et al. |
| 2020/0285977 | A1 | 9/2020 | Brebner |
| 2020/0320130 | A1 | 10/2020 | Korpman et al. |
| 2020/0322227 | A1 | 10/2020 | Janakiraman |
| 2020/0336376 | A1 | 10/2020 | Mahdi et al. |
| 2020/0364128 | A1* | 11/2020 | Vittal .................. G06F 9/45558 |
| 2020/0366580 | A1* | 11/2020 | Sinha .................. H04L 43/0823 |
| 2020/0366756 | A1* | 11/2020 | Vittal ....................... H04L 41/12 |
| 2020/0366759 | A1 | 11/2020 | Sinha |
| 2020/0382560 | A1 | 12/2020 | Woolward et al. |
| 2020/0412754 | A1* | 12/2020 | Crabtree ............. H04L 63/1425 |
| 2021/0149858 | A1 | 5/2021 | Xia et al. |
| 2021/0158161 | A1* | 5/2021 | Louizos ................... G06N 3/04 |
| 2021/0168016 | A1* | 6/2021 | Rao ......................... H04L 43/12 |
| 2021/0168116 | A1* | 6/2021 | Shulman ........... H04W 56/0015 |
| 2021/0174280 | A1 | 6/2021 | Ratnapuri |
| 2021/0327108 | A1* | 10/2021 | Kumari .................... G06F 17/11 |
| 2021/0342685 | A1 | 11/2021 | Dhurandhar et al. |

OTHER PUBLICATIONS 10 years of Kubernetes. (Jun. 6, 2024). Kubernetes. https://kubernetes.io/blog/2024/06/06/10-years-of-kubernetes/.

A brief history of containers. (n.d.). D2iq.com. Retrieved Jun. 19, 2025, from https://d2iq.com/blog/brief-history- containers.

Armbrust, Michael, et al. "Above the Clouds: A Berkeley View of Cloud Computing." UC Berkeley Reliable Adaptive Distributed Systems Laboratory, Feb. 2009, pp. 1-23.

Beal, Vangie "Cloud Computing Explained," published May 21, 2010, https://www.webopedia.com/reference/cloud-computing-guide/. Accessed Jun. 9, 2025.

Boesch, F. T. (1988). A Survey and Introduction To Network Reliability Theory. Stevens Institute of Technology.

Bollobas, B. (2000). Gradute Texts in Mathematics.

Computer Science Degree Program. (n.d.). Https://www.ohio.edu/~ucat/97-98/colleges/comsci.

Container-bsaed Virtualization. Utah.edu. Retrieved Jun. 19, 2025, from https://www.chpc.utah.edu/documentation/software/containers.ph.

Containers on HPC—Nurc Rtd. (n.d.). Northeastern.edu. Retrieved Jun. 19, 2025, from https://rc-docs.northeastern.edu/en/latest/containers/index.html.

Datadog. "11 Facts about Real World Container Use." Datadog, Nov. 17, 2020, https://www.datadoghq.com/container-report-2020/.

Datadog. "8 Surprising Facts about Real Docker Adoption." Datadog, Jun. 13, 2018, https://www.datadoghq.com/docker-adoption/.

Deo, N. (1974). Graph Theory with Applications to Engineering and Computer Science. Dover Publications.

Discrete mathematics. (n.d.). Metro State University. Retrieved Jun. 18, 2025, from https://www.metrostate.edu/academics/courses/math-215.

Du, Ling Quan' Yuijan, and Leitao Guo. "Cloud Computing: An Overview." Lecture Notes in Computer Science, vol. 5931, 2009, p. 626.

ECE 333: Introduction to Communication Networks Fall 2002. (n.d.).

Gross, J. L., Yellen, J., & Anderson, M. (2018). Graph Theory and Its Applications Third Edition.

Gruenberg, Austin. "The Introduction of Big Data in Cloud Computing." Minnesota State University Moorhead.

Hayes, B. (Jan.-Feb. 2000). Graph Theory in Practice: Part I. American Scientist, the Magazine of Sigma Xi, the Scientific Research Society, 88(1), 9-13.

Horrigan, John B. "Use of Cloud Computing Applications and Services." Pew Research Center, 12 Sep. 2008, https://www.pewresearch.org/internet/2008/09/12/use-of-cloud-computing-applications-and-services/.

https://nvlpubs.nist.gov/nistpubs/legacy/sp/nistspecialpublication, 800-145.pdf, Sep. 2011.

https://nvlpubs.nist.gov/nistpubs/SpecialPublications/NIST.SP.500-291r2.pdf, Jul. 2013.

J. A. Bondy and U. S. R. Murty. (1976). Graph Theory with Applications. Department of Combinatorics and Optimization, University of Waterloo.

J.A. Bondy and U.S.R. Murty, Graph Theory, 2000.

Johnston, S. (Mar. 21, 2024). 11 years of Docker: Shaping the next decade of development. Docker. https://www.docker.com/blog/docker-11-year-anniversary/.

LaMonica, Martin. "Study: Cloud Computing to Brighten Future of Data Centers." CNET, Mar. 11, 2008, https://www.cnet.com/culture/study-cloud-computing-to-brighten-future-of-data-centers/.

McQuillan, J. (n.d.). Graph Theory Applied To Optima L Connectivity in Computer Networks. Bolt Beranek and Newman Inc.

Mellinger, A. O., Nichols, W., & Palat, J. (n.d.). 11 leading practices when implementing a container strategy. SEI Blog. Retrieved Jun. 19, 2025, from https://insights.sei.cmu.edu/blog/11-leading-practices-when-implementing-a-container-strategy/.

Microsoft Press. (2002). Microsoft computer dictionary. Microsoft Press.

*Orca Security Ltd*, v. *Wiz, Inc.*, Inter Partes Review Case No. IPR2025-01084; U.S. Pat. No. 11,929,896. Jun. 4, 2025.

Postel, J. B., & Farber, D. (1976). Graph Modeling of computer communications protocols. https://escholarship.org/uc/item/2p87f03x.

Sadavare, A. B., & Kulkarni, R. V. (2012). A Review of Application of Graph Theory for Network. 3 (6).

Sakr, Majd F. "Introduction to Cloud Computing." Cloud Computing I (intro), 15-319, spring 2010. Second lecture, Jan. 14, 2010. Carnegie Mellon.

(56) References Cited

OTHER PUBLICATIONS

Software containers—research computing documentation. (n.d.). Uab.edu. Retrieved Jun. 19, 2025, from https://docs.rc.uab.edu/workflow_solutions/getting_containers/.

Srikantaiah, Shekhar et al. "Energy Aware Consolidation for Cloud Computing" published Dec. 2008. https://www.microsoft.com/en-US/research/publication/energy-aware-consolidation-for-cloud-computing/. Accessed Jun. 9, 2025.

Uhr, L. (1981). Compounding Denser (d,k) Graph Architectures for Computer Networks.

Undergraduate Catalog CSU (2000-2002). Csuohio.edu. Retrieved Jun. 19, 2025, from https://www.csuohio.edu/sites/default/files/ugradcatalog2000-2002.pdf.

Undergraduate Catalog. (1998-2000). The University of Texas-Pan American.

Velez, Jessica Garcia. "Cloud Computing Basics Explained." Eastern Oregon University, Eastern Oregon University Online, Oct. 9, 2020, https://online.eou.edu/resources/article/understanding-cloud-computing-basics/.

Webster's New World Dictionary and Thesaurus Second Edition (2002).

What are Containers—UArizona HPC Documentation. (n.d.). Arizona.edu. Retrieved Jun. 19, 2025, from https://hpcdocs.hpc.arizona.edu/software/containers/what_are_containers/.

Zen and the Art of the Internet. Www.ou.edu. Retrieved Jun. 19, 2025, from https://www.ou.edu/research/electron/internet/zen-glos.htm.

\* cited by examiner

SYSTEM AND METHOD FOR GENERATION OF UNIFIED GRAPH MODELS FOR NETWORK ENTITIES

CROSS-REFERENCED TO RELATED APPLICATION

This application is a continuation of U.S. patent application Ser. No. 17/161,190, filed Jan. 28, 2021. All contents are hereby incorporated by reference.

TECHNICAL FIELD

The present disclosure relates generally to cybersecurity, and, in particular, to systems and methods for automated generation of unified graph models for network entities.

BACKGROUND

As users, including large organizations such as businesses and governments, increase deployment of large-scale computing systems for data management, application processing, and other purposes, the same users may seek to better understand the technologies included in such systems, as well as the vulnerabilities thereof. As large-scale computing systems, such as configurations implemented through cloud service providers, such as Microsoft Azure® and Amazon AWS®, may include large numbers of components, devices, systems, and the like, including various types and deployments of each, and as connections between such components, devices, and systems may be similarly numerous and varied, users, administrators, and other interested parties may seek solutions providing for simple, unified understandings of the technologies included in such computing environments.

Current solutions to the analysis of the various systems, services, and the like, which may be included in a computing environment, include solutions directed to the analysis of live or recorded network traffic. Such traffic analysis systems provide for identification of activity within a network, but may fail to represent all components of a computing environment, such as those components which are not actively engaged in network communications during a traffic sampling period. Further, traffic-independent solutions, such as solutions directed to the identification of environment components, and connections therebetween, may provide for a more comprehensive understanding of the components and structure of a network or environment, but may fail to provide for generation of simple, unified views, particularly where networks, environments, and the like, include multiple, similar network components requiring separate analysis and representation. In addition, solutions directed to the identification of environment components and connections may provide for the representation of such environment features, but fail to provide such a representation in a graph format, preventing the execution of graph-specific commands and queries across such datasets.

Where a user's computing environment includes multiple, similar network components, such as dissimilar objects providing similar functionalities, current traffic-independent solutions may fail to provide concise, efficient rendition of such objects in a simplified network view. As a computing environment may include objects drawn from multiple sources which are configured to provide similar functionalities, such as native firewall objects included in Azure® and AWS® configurations, current traffic-independent network analysis systems may require separate analysis and representation of each object, reducing analysis efficiency and increasing cost.

Further, where such objects may be "implicit" from a network analysis perspective, such as various traffic management devices incorporated into a cloud platform host system, rather than a user's platform deployment, such implicit objects may not be exposed to an analytic system for representation in a simplified view. As a result, current traffic-independent solutions may fail to provide for the analysis and representation of such objects, where analysis and representation may be necessary to provide a thorough understanding of network or environment components and structures.

Further, in addition to such deficiencies of current traffic-independent solutions, such solutions fail to provide for the integrated representation and analysis of both "explicit" and "implicit" objects, as well as objects included in different layers of a computing environment. As a computing environment may include both "explicit" and "implicit" objects, such as, for example, infrastructure as a service (IaaS) deployments which include visible VMs, network interfaces, storage modules, and the like, and platform as a service (PaaS) deployments which include the same objects at the platform level, rendering such objects "implicit," analysis of such environments may require analysis of both "explicit" and "implicit" objects. However, current traffic-independent solutions fail to provide for the analysis of both types of objects, preventing the generation of network representations which provide for the inclusion and analysis of all relevant objects. Further, where an organization's computing environment includes objects and entities dispersed across multiple layers, current traffic-independent solutions fail to provide for the representation of all objects or entities in a single view or depiction, where such a unified view may provide for enhanced network analysis and complex querying, as well as other functionalities.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the terms "some embodiments" or "certain embodiments" may be used herein to refer to a single embodiment or multiple embodiments of the disclosure.

Certain embodiments disclosed herein include a method for generation of unified graph models for network entities. The method comprises collecting, for at least one network entity of a plurality of network entities, at least one network entity data feature, wherein the at least one network entity data feature is a network entity property; genericizing the collected at least one network entity; generating at least a network graph, wherein the generated network graph is a multi-dimensional data structure providing a representation of the plurality of network entities and relations between the network entities of the plurality of network entities; and storing the generated at least a network graph.

Certain embodiments disclosed herein also include a non-transitory computer readable medium having stored thereon instructions for causing a processing circuitry to execute a process for generation of unified graph models for network entities, the process comprising: collecting, for at least one network entity of a plurality of network entities, at least one network entity data feature, wherein the at least one network entity data feature is a network entity property; genericizing the collected at least one network entity; generating at least a network graph, wherein the generated network graph is a multi-dimensional data structure providing a representation of the plurality of network entities and relations between the network entities of the plurality of network entities; and storing the generated at least a network graph.

In addition, certain embodiments disclosed herein include a system for generation of unified graph models for network entities. The system comprises: a processing circuitry; and a memory, the memory containing instructions that, when executed by the processing circuitry, configure the system to: collect, for at least one network entity of a plurality of network entities, at least one network entity data feature, wherein the at least one network entity data feature is a network entity property; genericize the collected at least one network entity; generate at least a network graph, wherein the generated network graph is a multi-dimensional data structure providing a representation of the plurality of network entities and relations between the network entities of the plurality of network entities; and store the generated at least a network graph.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include collecting, for a network entity of a plurality of network entities, a network entity data feature, the network entity data feature including a network entity property. Method may also include genericizing the network entity based on the collected network entity data feature to generate a generic network entity. Method may furthermore include generating a network graph based on the generic network entity, where the generated network graph is a multi-dimensional data structure providing a representation of the plurality of network entities and relations between the network entities of the plurality of network entities. Method may in addition include storing the generated network graph. Other embodiments of this aspect include corresponding computer systems, apparatus, and computer programs recorded on one or more computer storage devices, each configured to perform the actions of the methods.

Implementations may include one or more of the following features. Method where the network entity property relates to any one of: a network entity type, a network entity class, a network entity category, a network entity configuration, and any combination thereof. Method where genericizing the network entity further comprises: generating a new generic network entity, where the new generic network entity includes a network entity property of the network entity. Method where genericizing the network entity further comprises: converting the network entity into a new generic network entity, where the new generic network entity includes a network entity property of the network entity. Method may include: generating an imputed entity, where the imputed entity is a generic network entity representing an executed platform functionality, and where the executed platform functionality is not executed by a network entity of the plurality of network entities. Method where generating the imputed entity further comprises: identifying any one functionality of: a platform functionality, an environment functionality, and a combination thereof, where the identified functionality corresponds with a functionality of a generic network entity. Method where the generated network graph includes an unified representation of the plurality of network entities. Method where the generated network graph includes an unified representation of a plurality of environment layers. Method where the generated network graph includes a graph vertex, where the graph vertex represents any one of: a network entity, a generic entity, and an imputed entity. Method where the graph vertex includes a property label, where the property label includes a description of a property of the graph vertex.

Method where the generated network graph includes a graph edge, where the graph edge is a connection between two graph vertices, and where the graph edge represents a relationship between two connected entities, where a connected entity is any one of: a network entity, a generic entity, and an imputed entity. Method where graph edge includes any one of: a property label, and a directionality indicator, where the property label includes a description of a property of the graph edge, and where the directionality indicator includes a description of a direction of the graph edge. Method may include: generating a visualization of the generated network graph. Method where storing the generated network graph further comprises: storing the generated network graph in a graph database. Method where a network entity of the plurality of network entities includes any one of: a private endpoint, a transit gateway, a tag-based ruleset, an entity configured to implement a tag-based ruleset, a container-management service, a container-management application, a third-party container, a third-party image, a web-access firewall, a firewall implementation, a multi-entity connection, a cross-entity connection, a container manager, a container manager connection, and any combination thereof. Implementations of the described techniques may include hardware, a method or process, or a computer tangible medium.

In one general aspect, non-transitory computer-readable medium may include one or more instructions that, when executed by one or more processors of a device, cause the device to: collect, for a network entity of a plurality of network entities, a network entity data feature, the network entity data feature including a network entity property; genericize the network entity based on the collected network entity data feature to generate a generic network entity; generate a network graph based on the generic network entity, where the generated network graph is a multi-dimensional data structure providing a representation of the plurality of network entities and relations between the network entities of the plurality of network entities; and store the generated network graph. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: collect, for a network entity of a plurality of network entities, a network entity data feature, the network entity data feature including a network entity property. System may in addition genericize the network entity based on the collected network entity data feature to generate a generic network entity. System may moreover generate a network graph based on the generic network entity, where the generated network graph is a multi-dimensional data structure providing a representation of the plurality of network entities and relations between the network entities of the plurality of network entities. System may also store the generated network graph. Other embodiments of this aspect include corresponding computer systems, apparatus, and computer programs recorded on one or more computer storage devices, each configured to perform the actions of the methods.

Implementations may include one or more of the following features. System where the network entity property relates to any one of: a network entity type, a network entity class, a network entity category, a network entity configuration, and any combination thereof. System where the memory contains further instructions that, when executed by the processing circuitry for genericizing the network entity, further configure the system to: generate a new generic network entity, where the new generic network entity includes a network entity property of the network entity. System where the memory contains further instructions that, when executed by the processing circuitry for genericizing the network entity, further configure the system to: convert the network entity into a new generic network entity, where the new generic network entity includes a network entity property of the network entity. System where the memory contains further instructions which when executed by the processing circuitry further configure the system to: generate an imputed entity, where the imputed entity is a generic network entity representing an executed platform functionality, and where the executed platform functionality is not executed by a network entity of the plurality of network entities. System where the memory contains further instructions that, when executed by the processing circuitry for generating the imputed entity, further configure the system to: identify any one functionality of: a platform functionality, an environment functionality, and a combination thereof, where the identified functionality corresponds with a functionality of a generic network entity. System where the generated network graph includes an unified representation of the plurality of network entities. System where the generated network graph includes an unified representation of a plurality of environment layers. System where the generated network graph includes a graph vertex, the graph vertex represents any one of: a network entity, a generic entity, and an imputed entity. System where the graph vertex includes a property label, the property label includes a description of a property of the graph vertex. System where the generated network graph includes a graph edge, the graph edge is a connection between two graph vertices, and the graph edge represents a relationship between two connected entities, a connected entity is any one of: a network entity, a generic entity, and an imputed entity. System where graph edge includes any one of: a property label, and a directionality indicator, where the property label includes a description of a property of the graph edge, and where the directionality indicator includes a description of a direction of the graph edge. System where the memory contains further instructions which when executed by the processing circuitry further configure the system to: generate a visualization of the generated network graph. System where the memory contains further instructions that, when executed by the processing circuitry for storing the generated network graph, further configure the system to: store the generated network graph in a graph database. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
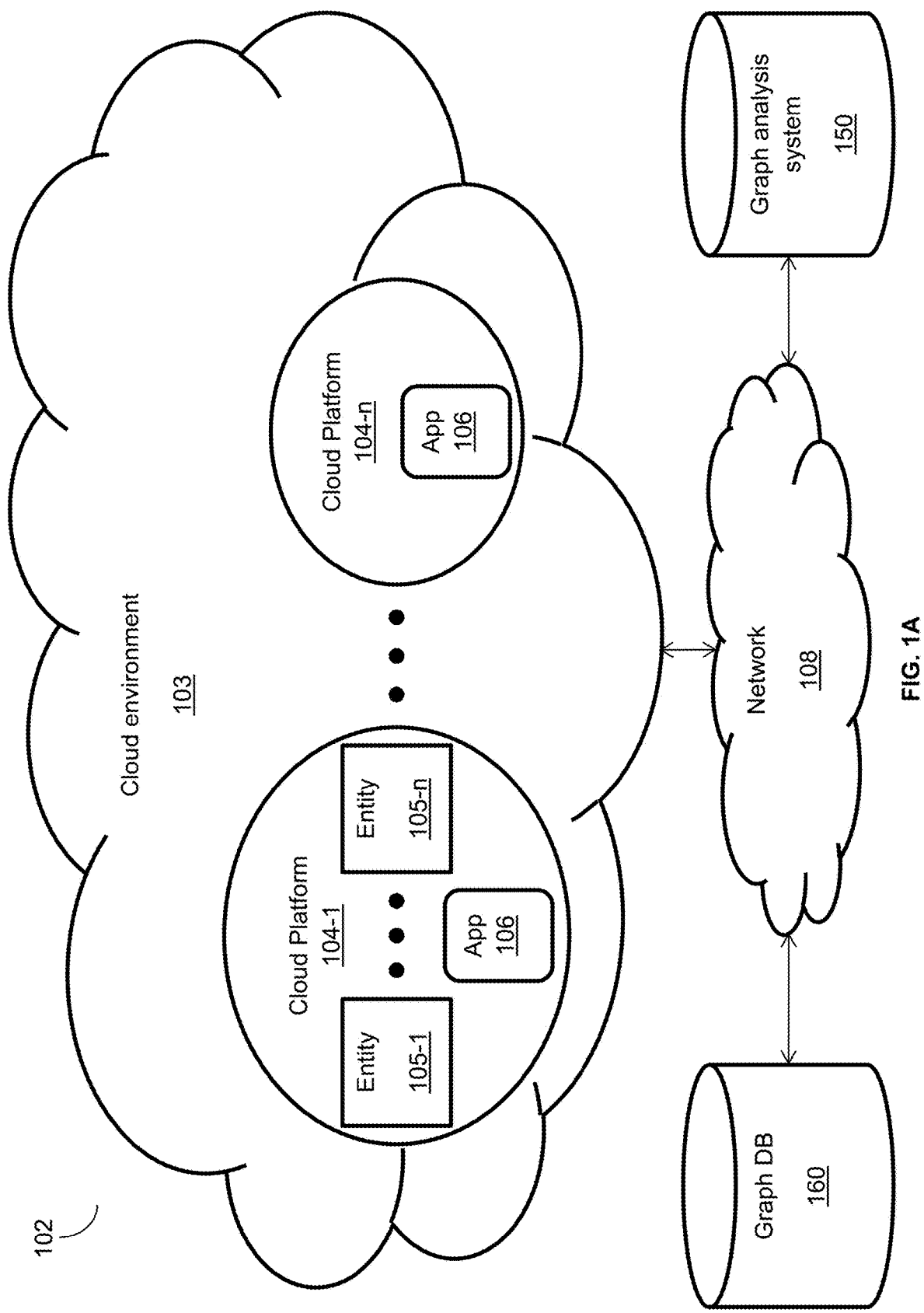
FIG. 1A is a diagram of a cloud environment utilized to describe the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The systems and methods described herein may be applicable to various systems, devices, networks, environments, layers, and the like, as well as cross-connections or multi-entity connections as may be established therebetween. The disclosed systems and methods may be applicable to provide support for various network features including, without limitation, application-layer communications, cloud-native constructs, cross-cloud and Kubernetes-to-cloud communications, third-party features, such as third-party containers and entities, container-management systems, such as Kubernetes, as may be virtualized as cloud entities, and the like, as well as any combination thereof.

Further, the systems and methods described herein may be applicable to various network graph models, and applications thereof. The systems and methods described herein may be relevant to unified graph models configured to represent network components from deployments and configurations including, without limitation infrastructure as a service (Iaas) deployments, platform as a service (PaaS) deployments, Kubernetes® deployments, multi-cloud configurations, other, like, deployments and configurations, and any combination thereof, including applications relevant to the modeling of cloud elements including, without limitation transit gateways, shared virtual private clients (VPCs), private links, and the like, as well as any combination thereof. Such relevant network graph models may be unified across all cloud environments, computing devices, services, and the like, including, without limitation, AWS® lambda services which are exposed to users, MongoDB® instances running on a container or PaaS database, and the like, as well as any combination thereof. Further, such network graph models may be configured to represent cloud implementations including, without limitation, security-group-based firewall rules, tag-based firewall rules, and the like, as well as any combination thereof. Such network graph models may be configured to include structures and features relevant to the maximization of model efficiency, the maximization of model-element visibility, and the implementation of various query languages, where such structures and features may include, without limitation, minimization of edges and nodes in a model, elimination of redundant edges, and the like, as well as any combination thereof.

FIG. 1A is an example diagram of a cloud environment 103 utilized to describe the various disclosed embodiments. A cloud environment 103 represents an organization's cloud-based resources, and the various connections between such resources. The cloud environment 103 may include a number of cloud computing platforms, 104-1 through 104-n (hereinafter, "cloud platforms" 104 or "cloud platform" 104), where a cloud platform may include multiple network entities, 105-1 through 105-n (hereinafter, "network entities" 105 or "network entity" 105), one or more applications (collectively referred to as applications or apps 106), and the like, as well as any combination thereof. Further, the cloud environment 103 may be configured to connect, via a network 108, with a graph analysis system 150, and a graph database 160, for one or more purposes including, without limitation, those described hereinbelow. As is applicable to the cloud platforms 104 and network entities 105, "n" is an integer having a value greater than or equal to two. Further, it may be understood that, while a single configuration of a cloud environment 103 is shown for purposes of simplicity, a cloud environment 103 may include various combinations of platforms 104, entities 105, applications 106, and the like, as well as any combination thereof, without loss of generality or departure from the scope of the disclosure.

A cloud platform 104 is a platform, architecture, or other, like, configuration providing for connectivity of the various entities 105, applications 106, and other, like, elements included in a cloud platform 104, as well as the execution of various processes, instructions, and the like. A cloud platform 104 may be a commercially-available cloud system, provided on a service basis, such as, as examples and without limitation, Amazon AWS®, Microsoft Azure®, and the like. A cloud platform 104 may be a private cloud, a public cloud, a hybrid cloud, and the like. In addition, a cloud platform 104 may include, without limitation, container orchestration or management systems or platforms such as, as an example and without limitation, a Kubernetes deployment, and the like, as well as any combination thereof.

A cloud platform 104 may be implemented as a physical network of discrete, interconnected entities, and the like, a virtual network, providing for interconnection of various virtual systems and devices, as well as a hybrid physical-virtual network, including both physical and virtualized components. A cloud platform 104 may be, or may replicate or otherwise simulate or emulate, as examples, and without limitation, a local area network, a wide area network, the Internet, the World-Wide Web (WWW), and the like, as well as any combination thereof. Further, a cloud platform 104 may include one or more subnets, such as the subnets, 130, of FIG. 1B, below, wherein each subnet may be configured to serve as a cloud platform 104 for the various network entities which may be included in the subnet, while retaining the connectivity and functionalities provided by the cloud platform 104.

Network entities 105, as may be included in a cloud platform 104, are entities, systems, devices, components, applications, objects, and the like, configured to operate within the cloud platform 104 and provide various functionalities therein. Specifically, the network entities 105 may be, as examples without limitation, entities configured to process data, send data, or receive data, as well as entities configured to provide various other functionalities, and any combination thereof. The network entities 105 may be configured to connect with various other network entities 105, various external entities, and the like, as well as any combination thereof, for purposes including, without limitation, sending data, receiving data, monitoring data transmissions, monitoring network status and activity, and the like, as well as any combination thereof.

Examples of network entities 105 include, without limitation, entities providing support for application-layer communications and systems, including application-layer communications and systems relevant to layer seven of the open systems interconnection (OSI) model. Further examples of network entities 105 may include cloud-native constructs, such as private endpoints, transit gateways, tag-based rulesets and entities configured to apply such rules, Kubernetes Istio and Calico services and applications, and the like. In addition, examples of network entities 105 may include, without limitation, third-party containers and images, such as Nginx, web-access firewall (WAF), and firewall implementations, multi-entity or cross-entity connections, such as cross-cloud connections and Kubernetes-to-cloud connections, as well as container managers, such as Kubernetes, and connections therewith. It may also be understood that network entities 105 may include other entities similar to those described hereinabove, as well as any combination thereof. As another example, network entities 105 may include virtual entities, devices, and the like, to process layer-7 (application layer) traffic, such as entities relevant to Amazon AWS® layer seven services and applications, Amazon Load Balancer® (ALB) layer seven services and applications, Kubernetes ingress, and the like.

The network entities 105 may be configured to include one or more communication ports, where the included communication ports provide for connection of various entities according to one or more protocols, and at different communication layers of the OSI model.

In an example configuration, the network entities 105 are virtual entities or instances of systems, devices, or components, including virtual systems, devices, or components, or any combination thereof. Examples of network entities 105 include, without limitation, virtual networks, firewalls, network interface cards, proxies, gateways, containers, container management objects, virtual machines, subnets 130, hubs, virtual private networks (VPNs), and the like, as well as any combination thereof.

The applications 106 (or cloud applications), as may be executed in one or more cloud platforms 104, are services, processes, and the like, configured to provide one or more functionalities by execution of various commands and instructions. The applications 106 may be part of a software project of an enterprise or organization. The applications 106 may interact or communicate with other applications 106, regardless of the platform 104 in which the applications 106 are deployed. Examples of applications 106 include, without limitation, databases, serverless functions, web servers, buckets, and the like, as well as any combination thereof. It should be understood that multiple instances of a single application 106 may be both present and executed in multiple cloud platforms 104, including multiple cloud platforms 104 of the same cloud environment 103, without loss of generality or departure from the scope of the disclosure.

The network 108 is a communication system providing for the connection of the cloud environment 103, and its various components and sub-parts, with a graph analysis system 150, and a graph database 160, as well as other, like, systems, devices, and components, and any combination thereof. The network 108 may be a physical network, a virtual network, as well as a hybrid physical-virtual network, including both physical and virtualized components. The network 108 may be, as examples, and without limitation, a local area network, a wide area network, the Internet, the World-Wide Web (WWW), and the like, as well as any combination thereof.

The graph analysis system 150 is a system, device, or component, configured to perform the various disclosed embodiments of graph-related functionalities. Specifically, the system 150 may provide functions including, without limitation network analysis, traffic analysis, entity querying, graph generation, and the like, as well as any combination thereof. The graph analysis system 150 may be configured to execute one or more instructions, methods, processes, and the like, including, without limitation, the process described with respect to FIG. 2, other, like, processes, and any combination thereof.

The graph analysis system 150 may be configured as a physical system, device, or component, as a virtual system, device, or component, or in a hybrid physical-virtual configuration. A detailed description of a graph analysis system, 150, according to an embodiment, is provided with respect to FIG. 6, below. It may be understood that, while the graph analysis system 150 is depicted in FIG. 1A as a discrete element external to the cloud environment 103, the graph analysis system 150 may be included within any of the various elements of the network system 102, including the cloud environment 103, the various cloud platforms 104, and subparts thereof, and the network 108, without loss of generality or departure from the scope of the disclosure.

The graph database (graph DB) 160 is a storage or memory component, device, system, or the like, configured to provide one or more functionalities relevant to storage of graph-related data. The graph DB 160 may be configured to store graph-related data features of one or more types or formats, including, without limitation, raw data, graphs, graph edges, graph vertices, graph schemas, and the like, as well as any combination thereof, including those types or formats described hereinbelow.

Graphs, as may be included in the graph DB 160, are data features including one or more graph vertices, where such graph vertices may be variously interconnected by one or more graph edges. Graphs may be configured to provide for one or more representations of various data sets, including, without limitation, presentation of network data according to one or more graph schemas, as described hereinbelow. As an example, a graph relevant to the description of a collection of interconnected network entities may include one or more graph vertices, where each graph vertex corresponds with a network entity, and graph edges between such vertices, the edges corresponding with connections between the various network entities. Graphs, and elements thereof, may be generated based on one or more data sets, including during the execution of a graph generation process, such as is described with respect to FIG. 2, below.

The graph DB 160 may be configured to store one or more graphs, graph, related data features, and the like, as well as any combination thereof. Graphs, as may be stored in the graph DB 160, may be configured to include one or more functional attributes, including, without limitation, directionality, labeling, and the like, where such functional attributes may provide for the execution or enhancement of one or more processes or methods which would be inapplicable to a graph not including such functional attributes. A graph including directionality may be configured to include connection between graph nodes or vertices, via graph edges, as described herein, where the edges connecting such vertices may be uni-directional or bi-directional, providing for enhanced analysis of network entity structures and relationships. Further, a graph configured to include labeling functionality may be configured to provide for the labeling of graph vertices, graph edges, or both, with one or more labels describing the various properties of the labeled vertices or edges. As an example, a graph vertex representing a virtual machine (VM) may be configured to include a "name" label, describing a name property of the VM. Further, the VM may be configured to run a container entity, where the container entity, as represented in the graph, may be respectively labeled. In addition, according to the same example, the connection, or edge, between the vertices representing the VM and the container entity may be uni-directional and may be labeled as a "run" edge, providing for analysis of the relationship between the vertices, the direction of the relationship, and the type of the relationship.

The graph DB 160 may be configured as a physical system, device, or component, as a virtual system, device, or component, or in a hybrid physical-virtual configuration. It may be understood that, while the graph DB 160 is depicted in FIG. 1A as a discrete element external to the cloud environment 103, the graph DB 160 may be included within any of the various elements of the network system 102, including the cloud environment 103, the various cloud platforms 104, and subparts thereof, and the network 108, without loss of generality or departure from the scope of the disclosure. Further, it may be understood that the graph DB 160 may be directly connected to, or realized as a component of, the graph analysis system 150, without loss of generality or departure from the scope of the disclosure.

Figure 1B:
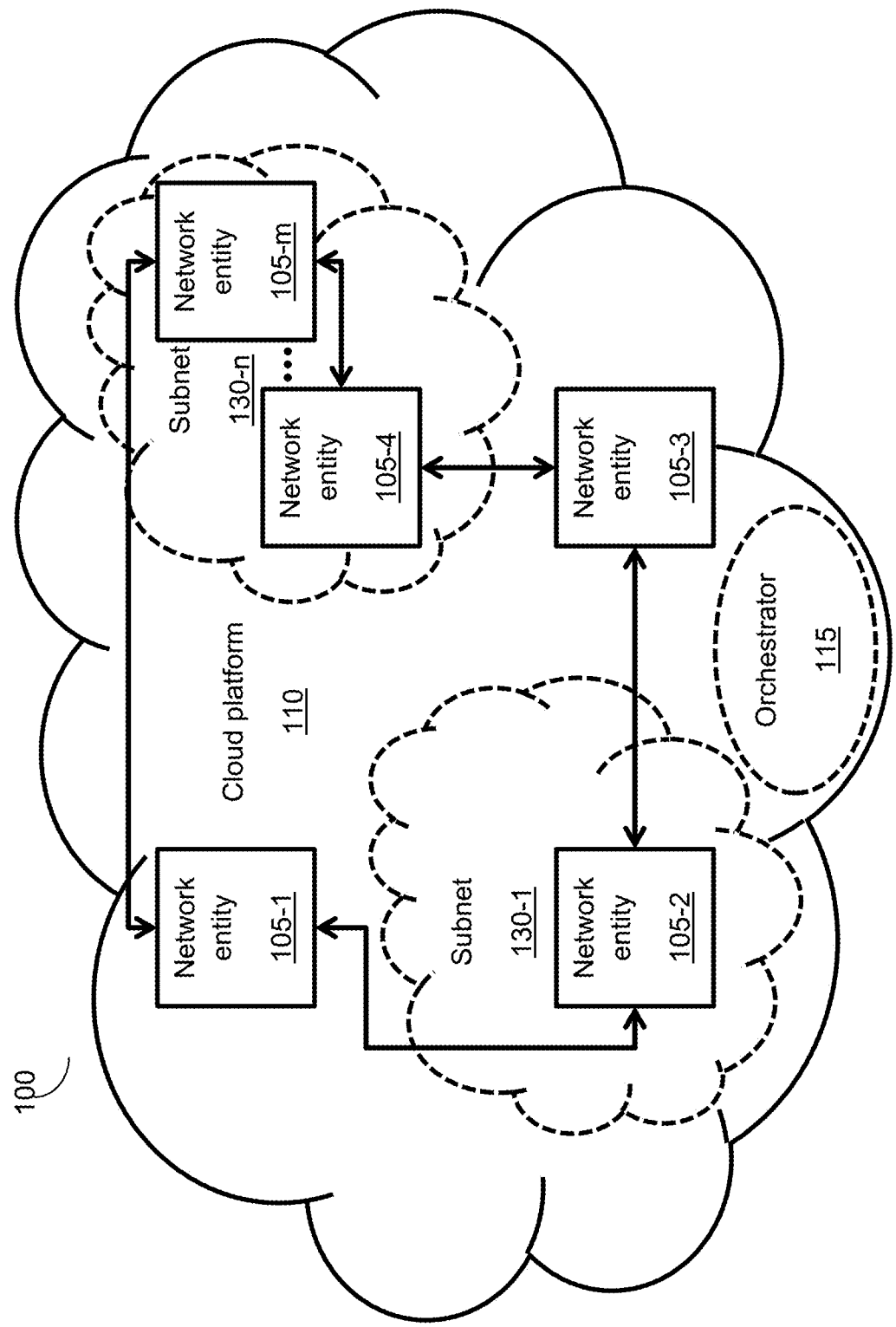
FIG. 1B is a network diagram depicting a network system and various associated network and external entities utilized to describe the various embodiments.

FIG. 1B is an example diagram depicting a network system 100 and various associated network and external entities utilized to describe the various embodiments. The depicted network system 100 includes a cloud platform 110, where the cloud platform 110 may be a cloud platform similar, or identical to, a cloud platform, 104, of FIG. 1A, above. The cloud platform 110 includes various subnets, 130-1 through 130-n (hereinafter, "subnets" 130 or "subnet" 130), and various network entities, 105-1 through 105-m (hereinafter, "network entities" 105 or "network entity" 105). As is applicable to the subnets 130, "n" is an integer having a value greater than or equal to two. Further, as is applicable to the network entities 105, "m" is an integer having a value greater than or equal to five. In addition, while the network system 100 of FIG. 1B includes certain elements and combinations of elements, as well as connections therebetween, it may be understood that the depiction is provided for illustrative purposes, and that other, like, elements, combinations of elements, and connections therebetween, may be implemented without loss of generality or departure from the scope of the disclosure. Other, like, network systems 100 may further include multiple cloud platforms 110, including variously-interconnected cloud platforms 110, and other, like, variations and configurations, without loss of generality or departure from the scope of the disclosure.

The cloud platform 110 may be configured to include an orchestrator 115. The orchestrator 115 is configured to provide for management of the cloud platform 110. The orchestrator 115 may be configured to provide one or more functionalities including, without limitation, monitoring of elements or components of the cloud platform 110, logging and reporting data relating to the cloud platform 110, managing cloud platform 110 updates and maintenance, generating cloud platform 110 alerts, as well as other, like, functionalities, and any combination thereof. The orchestrator 115 may be configured to report one or more data features related to the cloud platform 110, such as may be requested or collected during the execution of graph generation processes, such as those described hereinbelow.

The network entities 105 are network entities similar or identical to those network entities, 105, of FIG. 1A, above. As described with respect to FIG. 1A, the network entities 105 are virtual entities or instances of systems, devices, or components, including virtual systems, devices, or components, or any combination thereof. Examples of network entities 105 include, without limitation, virtual networks, firewalls, network interface cards, proxies, gateways, containers, container management entities, virtual machines, subnets 130, hubs, virtual private networks (VPNs), peering connections, load balancers, route tables, and the like, as well as any combination thereof.

External objects, as may be adjacent or relevant to a cloud platform 110, are entities similar or identical to the network entities 105. The external entities may be configured to communicate with one or more network entities 105, with other, various, external entities, and the like, as well as any combination thereof.

Figure 2:
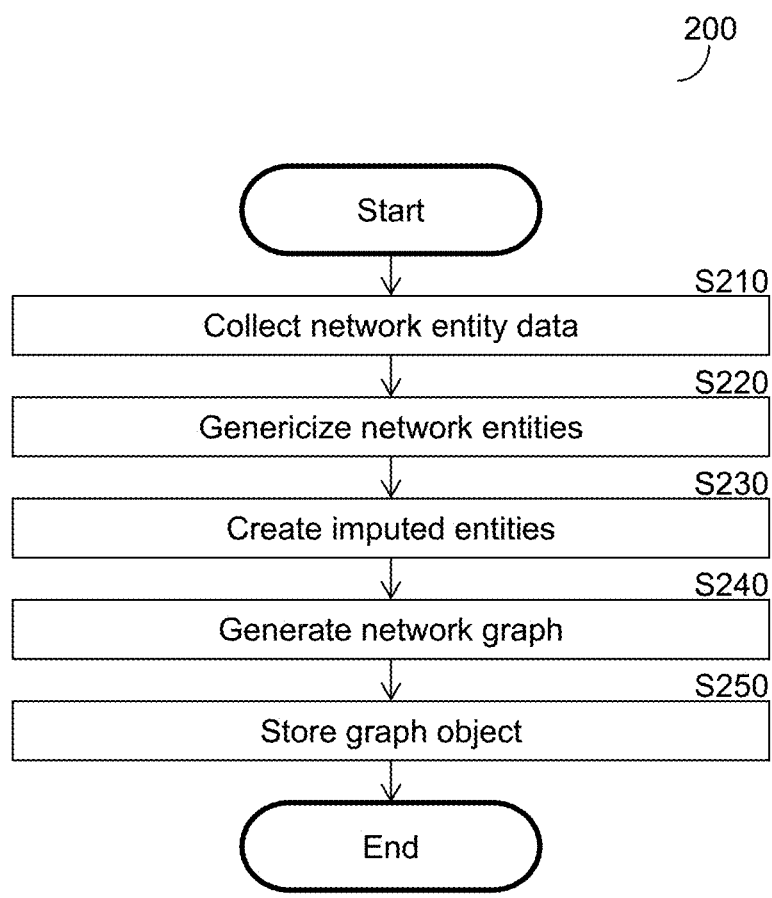
FIG. 2 is a flowchart depicting a method for generating unified graph models for network entities, according to an embodiment.

FIG. 2 is an example flowchart 200 depicting a method for generating unified graph models for network entities, according to an embodiment.

At S210, network entity data is collected. Network entity data, as may be collected at S210, is data describing one or more entities included in a network, cloud, environment, or other, like, deployment. Network entity data may include data describing the various network entities including, as examples and without limitation, properties, names, network addresses, permissions, properties, configurations, other, like, network entity data features, and any combination thereof. Network entity data may be collected from one or more network entities, such as those described in detail above.

Network entity data may be collected at S210 via one or more processes including, without limitation, application of various network entity scanning applications or processes, application of network entity application programming interface (API) commands, calls, and the like, collection from one or more network, cloud, or environment orchestrators, including orchestrators similar or identical to those described hereinabove, other, like, processes, and any combination thereof.

At S220, network entities are genericized based on the collected network entity data. Generic network entities, which may be created at S220, are network entities which are configured to include one or more standard properties. Such standard properties may be applicable to all genericized network entities of the same type. As an example, a genericized network entity may be a generic proxy object, and, according to the same example, separate, differently configured specific proxy objects, such as an Azure®-native proxy object and an AWS®-native proxy object, may be genericized at S220 for representation as generic proxy objects.

In an embodiment, S220 may include the generation of new generic network entities, and the conversion of existing specific network entities into generic network entities. Generic network entities may include one or more properties relevant to the type, class, or other, like, category of network entity. Relevant properties may include properties common to specific network entities configured to achieve the same or similar functionalities. Common properties may include one or more properties relevant to the execution or provision of such functionalities.

Generic entity properties may be defined according to one or more property configurations, including, without limitation, pre-defined properties, user-defined properties, properties defined based on sampled specific entities, other, like, bases, and any combination thereof. Further, generic entity properties may be based on analysis of runtime data features such as, without limitation, lists of entities to which a given entity connects during routine operation, as may be determined by processes including, without limitation, analysis of entity codebases or resources, analysis of runtime logs or reports, and the like, as well as any combination thereof. According to the example described hereinabove, a generic proxy object may be configured to include properties relevant to the execution of proxy functionalities, and common to various specific property objects included in separate deployments, such as, as examples and without limitation, proxy rules, port configurations, and the like, as well as any combination thereof.

Genericization at S220 includes, in an embodiment, converting specific objects into generic objects, or generating new generic objects based on specific objects, or a combination thereof. In a further embodiment, S220 may include identifying types, classes, or other, like categories of specific entities, using, for example, comparison of specific entity properties, configurations, and the like, with one or more dictionaries, repositories, or other, like, sources of entity type information. Further, the new generic entities may be entities matching the type, category, or the like, of the identified specific entity or entities, where the new generic entities may include one or more properties of the corresponding specific entities. The genericization of network entities, as at S220, is further described with respect to FIG. 4, below.

As an example, an AWS®-native proxy objects, network load balancers, application load balancers, application programming interface (API) gateways, and the like, may be, at S220, genericized as generic proxy objects. According to the same example, the AWS®-native specific proxy object may be identified as a proxy-type entity based on the inclusion of data features matching proxy rules within the object's codebase, resource files, and the like. Further, the genericized proxy object, created at S220, may include one or more properties of the AWS®-native proxy object, such as the AWS®-native object's specific proxy rules.

Further, examples of relevant types of generic entities include, without limitation, entities configured to apply routing rules, network interfaces, entities configured to apply security rules, subnets and virtual networks, gateways, and the like, as well as any combination thereof. According to the same example, generic entities representing entities configured to apply routing rules may be generated, or converted from corresponding specific entities, or both, at S220, providing for the genericization of separate, similar entities configured to apply such rules, where the separate entities may include different routing rules or tables, providing for the genericization of such entities into a unified format and, subsequently, providing for the execution of unified queries or commands across such genericized entities.

Likewise, according to the same example, generic entities representing network interfaces may be generated, or converted from corresponding specific entities, or both, at S220, providing for genericization of separate, similar network interfaces, thus providing for encapsulation of the interfaces' network properties. Similarly, according to the same example, generic entities representing entities configured to apply security rules, such as security group rules, network access control lists (ACLs), database ACLs, and the like, may be generated, or converted from corresponding specific entities, or both, at S220, providing for the genericization of such specific entities in a unified format.

In addition, according to the same example, generic entities representing subnets and virtual networks, which may include routing rules and security rules, and which may be applicable to the description of network hierarchies, may be generated, or converted from corresponding specific entities, or both, at S220, providing for genericization of such entities and, subsequently, execution of one or more unified queries across such entities, including graph traversal commands relevant thereto. Further, according to the same example, generic entities representing gateways, such as internet gateways, relevant to searching the internet connectivity of objects, transit gateways, including complex routing rules and attachments, may be generated, or converted from corresponding specific entities, or both, at S220, providing for genericization of such entities.

At S230, imputed entities are created. Imputed entities are generic entities similar or identical to those described with respect to S220, above, which may be constructed to provide representation of network entities which are integrated into host platforms, or network entities which are shielded from, or not otherwise exposed to, a system configured to execute network analysis processes and methods, including the method described with respect to FIG. 2, where such a system may be, without limitation, the graph analysis system 150 of FIG. 1A. Imputed entities may be of various types, classes, or categories corresponding to the types, classes, and categories of generic entities, such as the entities genericized at S220, and may include one or more properties corresponding to such types, classes, or categories.

In an embodiment, imputed entities may be created using identification of platform or environment functionalities which correspond with functionalities of generic entities. Creation of imputed entities using identification of functionalities may include identification of functionalities which are not provided by any network entities, such as the network entities from which data is collected at S210. Following identification of functionalities not provided by any network entities, creation of imputed entities may include creation of a generic imputed entity with types, properties, and the like, matching an entity configured to provide the described functionality, in addition to other, like, means, and any combination thereof. Where imputed entity creation includes identification of platform or environment functionalities corresponding to entities not included in data collection at S210, such identification may include application of one or more processes or methods including, without limitation, identification of functionalities by comparison of platform or environment data flows with data flows relevant to simulated platforms or environments including only the entities included in data collection, identification of functionalities by analysis of platform or environment host or provider feature descriptions, identification by other, like, means, and any combination thereof.

As an example, where a cloud platform provider includes a load balancing functionality in all platform deployments by inclusion of a load balancer in a platform host, rather than in client deployments, a generic load balancer entity may be created, as an imputed entity, at S230. According to the same example, the inclusion of a provider-based load balancer functionality may be identified by comparing the data flow of a process executed across the deployed platform with a data flow of the same process executed across a simulated platform including only those entities included in data collection, providing for the identification of load balancer functionality based on differences between the analyzed data flows. According to the same example, a generic, imputed load balancer entity may be created at S230 where a load-balancing process or functionality is identified, but where the entity executing the process or functionality is not identified, providing for representation of a load balancer provided by a platform host as a discrete, generic entity.

It may be understood that the creation of imputed entities at S230 may be executed at any point after the initiation of S220, including simultaneously with S220, without loss of generality or departure from the scope of the disclosure.

At S240, a network graph is generated. A graph is a multi-dimensional data feature providing a representation of the contents and structure of a network, cloud, environment, or the like. A graph may include one or more graph vertices, interconnected by one or more graph edges. Where, as at S240, a graph is generated to represent a network, cloud, environment, or the like, each graph vertex may correspond with a network entity included in the network, cloud, environment, or the like, and each graph edge may correspond with a connection between such entities. Further, the entities with which the various graph vertices correspond may be generic entities, such as are described with respect to S220, imputed generic entities, such as are described with respect to S230, as well as any combination thereof.

A graph, as may be generated at S240, may be configured to represent one or more elements of a graph database, such as, as an example, the graph DB 160 of FIG. 1A, above, as well as other, like, graph databases, where such graph databases may be configured to include various tables and other, like, arrangements of network entity information. Where a graph is configured to represent the elements of one or more graph databases, the graph may include various nodes or vertices corresponding with the various entries included in such databases, as well as tables, and the like, included therein. Further, where a graph is configured to represent the elements of one or more graph databases, the graph may include one or more edges, where such edges may represent relationships between the various entries included in such databases. Relationships between graph database entries, as may be represented as graph edges, may be identified by one or more analyses including, without limitation, analysis of graph database entry properties or attributes, analysis of graph database structures or formats, by other, like, analyses, and any combination thereof.

In an embodiment, such analysis of graph database entry properties or attributes may include execution of one or more resolution processes. According to the same embodiment, a resolution process is a process configured to identify one or more relationships between one or more network entities based on the known properties of such entities. Further, where execution of such a resolution process includes identification of such a relationship, the identified relationship may be, during graph generation at S240, included in a generated graph as a graph edge, linking the various graph vertices which correspond with the network elements between which the identified relationship exists. As an example, according to the same embodiment, a resolution process may be executed over a network segment including a load balancer configured to assign traffic to either of two connected backend pools, where the backend pools each include a proxy object configured to assign traffic to the various virtual machines (VMs) included in the proxy' objects' respective pools.

In the same example, the load balancer entity may include one or more load balancer rules, extracted at S240 as load balancer properties, where the load balancer rules may specify the related backend pools, such as by reference to backend pool identifiers or IP addresses. Further, according to the same example, each of the proxy objects may include proxy routing rules, which may be extracted as proxy object properties, specifying the assignment of traffic from the proxy objects to the various VMs of the proxy objects' respective pools. According to the same example, the resolution process may include the identification of relationships between the load balancer and the proxy objects based on the properties of the load balancer and the proxy objects, as well as identification of the relationships between the proxy objects and the objects' respective VMs, based on the properties of the objects and the VMs. Further, in the same example, the resolution process may include, following the identification of such relationships, the generation of graph edges corresponding with the identified relationships.

Further, a graph, as may be generated at S240, may be configured to provide for execution of one or more queries, commands, instructions, and the like, over the graph, as well as the various data features included therein. The structure of a graph, including several vertices, representing network entities, joined by graph edges, representing entity-to-entity relationships, provides for the execution of various standard, unified queries and commands over the graph, and data thereof. Such queries and commands may be automated, such as by application of one or more algorithms configured to generate and execute such queries and commands, or non-automated, such as by user entry or selection of one or more queries or commands, such as through a graph user interface (UI). Further, such queries and commands may be configured to provide for the extraction of one or more insights based on a graph, and the contents thereof, where insights may be natural-language descriptions of graph features, such as "entity A is accessible from entity B via port X through entities C and D." Examples of commands or queries applicable to unified graphs, such as may be generated at S240, include, without limitation, UI queries, backend queries, graph algorithms, and the like, as well as any combination thereof.

Further, in an embodiment, a graph may be configured to provide for the execution of various user-defined commands, queries, instructions, and the like, where such user-defined commands may include, as an example and without limitation, a custom alert configured to generate a notification upon identification of an undesirable feature of a network graph, such as an unsecured internet connection.

As an example, where a graph database includes separate tables of virtual machines, databases, and proxy entities included in a network, where the graph database is configured to include connections between entries in the same table, as well as entries in different tables, execution of S240 may include the generation of one or more graphs representing the contents of the graph database. The graph generated to represent the graph database, at S240, may include multiple graph vertices, where each graph vertex corresponds to an entry in a table of the graph database, as well as graph edges linking the various vertices, where each graph edge corresponds with a relationship between two entries in the graph database.

In an embodiment, the various graph vertices, and interconnecting graph edges, may be configured to include one or more descriptive data features. The descriptive data features may be configured to provide representation for one or more properties of the entities or connections corresponding with the various graph vertices and edges, such properties including, without limitation, entity names, addresses, types, configurations, edge direction, and the like, as well as any combination thereof.

At S250, the generated network graph is stored in a graph database. Storage of a graph object at S250 may include storage of a graph object as a unified representation of network or environment entities, and relationships therebetween, providing for functionalities including, without limitation, execution of unified queries across graphs or graph elements, execution of unified graph management commands or instructions, other, like, functionalities, and any combination thereof.

In an embodiment, providing a unified representation for network objects, and generation of the network graph, allows for querying of the graph using a simplified and unified set of queries, configuring network entities using a simplified and unified set of comments, and generating insights with respect to the network entities included in the environment.

In yet another embodiment, the network graph may be utilized to generate and return a graph visualization at S250. A graph visualization is a visual representation of the network graph.

The graph visualization may be generated by, for example, generation of one or more visual overlays, presentations, or other, like, representations of graph data, such as the visualization described with respect to FIG. 3, below. Such generation of visual representations of graph data may include the generation of visual representations where graph vertices are depicted as points, nodes, or other, like, discrete, visual indications, and where graph edges are depicted as visible interconnections between such points, nodes, and the like, such as lines. Further, generation of such visual representations may include labeling, tagging, or otherwise associating the depicted vertices and edges with one or more visual descriptors, where such visual descriptors may be configured to provide information including, without limitation, element names, types, statuses, edge directionality, and the like, as well as any combination thereof. In an embodiment, such visual descriptors may be configured to display upon selection of a graph element, such as by clicking an element with a computer mouse during presentation of a visualization through a graph visualization presentation platform.

The graph visualization, as may be generated and returned at S250, may be configured to provide for one or more functionalities including, without limitation, visualization of network, cloud, or environment elements and connections, user interactivity, such as by clicking elements or connections to display relevant information, searching or querying of graph elements or underlying graph data features, and the like, as well as any combination thereof. An example of a graph visualization is described with respect to FIG. 3, below.

Figure 3:
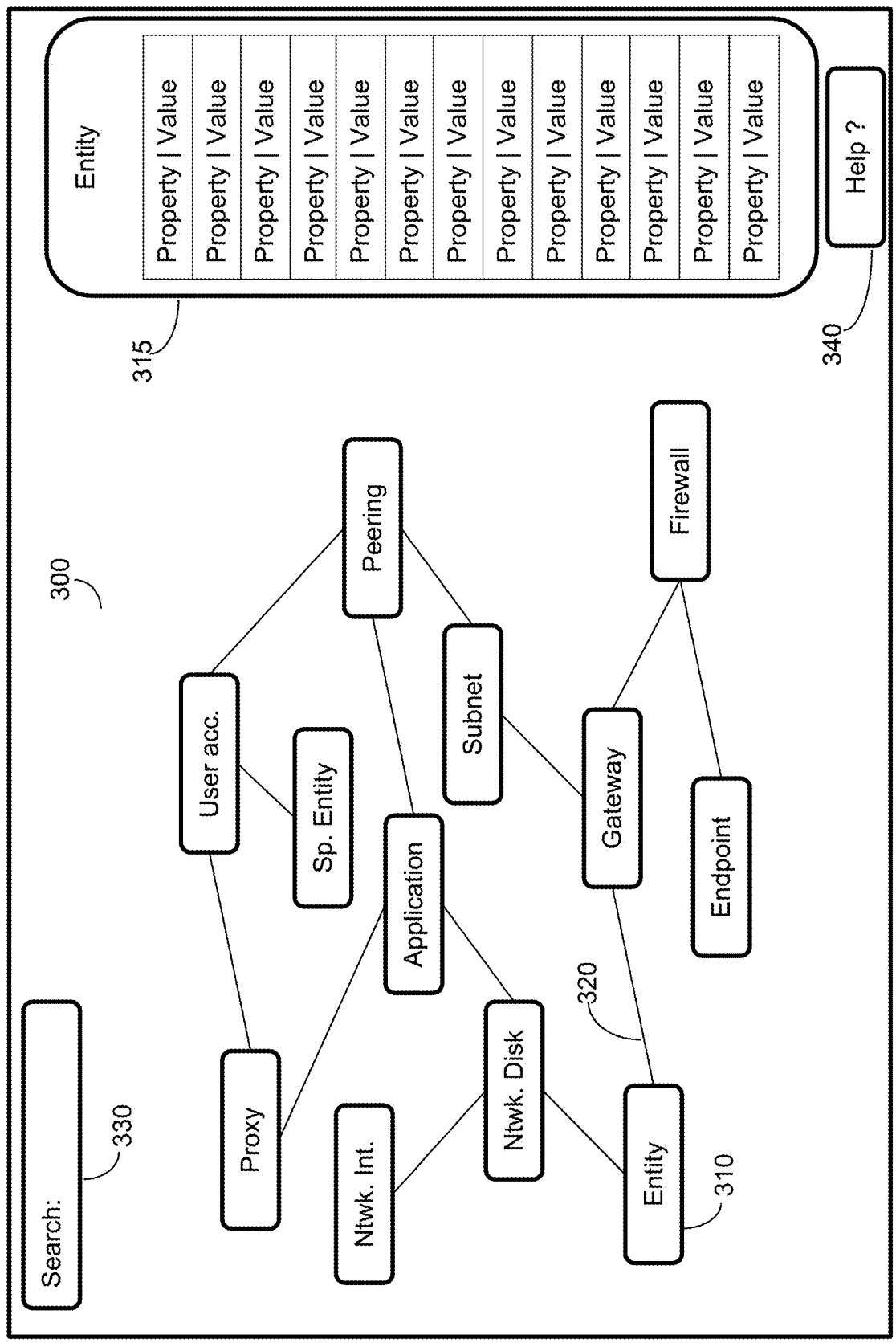
FIG. 3 is a network graph visualization, according to an embodiment.

FIG. 3 is an example of a network graph visualization 300, according to an embodiment. The example network graph visualization 300 is generated as a visual representation of a network, cloud, environment, or the like, where such generation is described with respect to S250, above, and where the visualization is presented through a network graph visualization utility. A network graph visualization utility may be an application, interface, or other, like, means of providing a visual representation of a network graph visualization 300, and the like, where the provided network graph visualization 300 may include various interactive features, as described hereinbelow. A network graph visualization utility may be configured as, as examples and without limitation, a web interface, an application or executable installed on a user or administrator device, other, like, configurations, and any combination thereof.

The network graph visualization 300 of FIG. 3 is a network graph visualization representing a network, such as the networks described hereinabove, where the various entities, systems, devices, components, and the like, of the network are represented as visualizations of graph vertices 310, and where such nodes are variously interconnected by visualizations of graph edges 320, representing connections between the various entities, systems, devices, components, and the like. It may be understood that while only one graph vertex visualization 310 and one graph edge visualization 320 are labeled for purposes of simplicity, other, like, vertex visualizations 310 and edge visualizations 320 may be so labeled without loss of generality or departure from the scope of the disclosure.

The network graph visualization 300, and corresponding network graph visualization utility, may be configured to provide for various interactive functionalities. In an embodiment, where a user interacts with a graph vertex visualization 310, such as by clicking the graph vertex visualization 310 with a mouse or tapping the graph vertex visualization 310 through a touchscreen, the graph visualization utility may be configured to display a graph vertex overview pane 315. The graph vertex overview pane 315 may be an information panel, including data relating to the given graph vertex visualization 310 and describing various entity data features, such as those object data features collected at S210 of FIG. 2, above. The graph vertex overview pane 315 may be configured to provide information relating to the various vertex visualizations 310 including, as examples and without limitation, object names, types, statuses, relevant metadata, and the like, as well as any combination thereof.

In addition, the network graph visualization 300, and corresponding network graph visualization utility, may be configured to provide for the selection of one or more graph visualization 300 views. A graph visualization 300 view is a selective presentation of one or more aspects of a graph visualization 300, including selection of, as examples and without limitation, entities and connections external to a specified network, cloud, environment, or the like, entities and connections included in a first network of a cloud environment, entities and connections relevant to a specified product, service, process, or the like, entities and connections having one or more specified criteria, and the like, as well as any combination thereof. A network graph visualization, and the corresponding network graph utility, may be configured to provide such views by one or more means including, without limitation, generation of displays including only relevant objects and connections, generation of displays including application of identifying highlights, shading, or the like, to such relevant entities and connections, other, like, means, and any combination thereof.

Further, the network graph visualization 300, and corresponding network graph visualization utility, may be configured to include a search tool 330, providing for location and selection of one or more user-specified graph vertex visualizations 310 or graph edge visualizations 320 within the graph. The search tool 330 may be configured to provide for search functionality based on one or more user specifications including, as examples and without limitation, entity or connection names, types, IDs, statuses, labels or tags associated with various elements of the network graph visualization 300, and the like, as well as any combination thereof. Further, the search tool 330 may be configured to provide for the execution of one or more compound queries, such as queries relating to objects or connections including multiple attributes, each attribute matching an element of the query. The search tool 330 may be further configured to provide for the execution of one or more searches or queries, as described herein, including, without limitation, complex queries, as described, to or on one or more views, such as those views described hereinabove. In addition, the network graph visualization 300, and corresponding network graph visualization utility, may be configured to include a help tool 340, providing for display of one or more resources related to the network graph visualization 300 and network graph visualization utility.

It should be noted that a network graph visualization 300, shown in FIG. 3, provides a visual representation of graph data, where such data may be provided in other formats including, without limitation, tables, charts, other, non-visual, data organization formats, lists of entities, other, like, formats, and any combination thereof.

Figure 4:
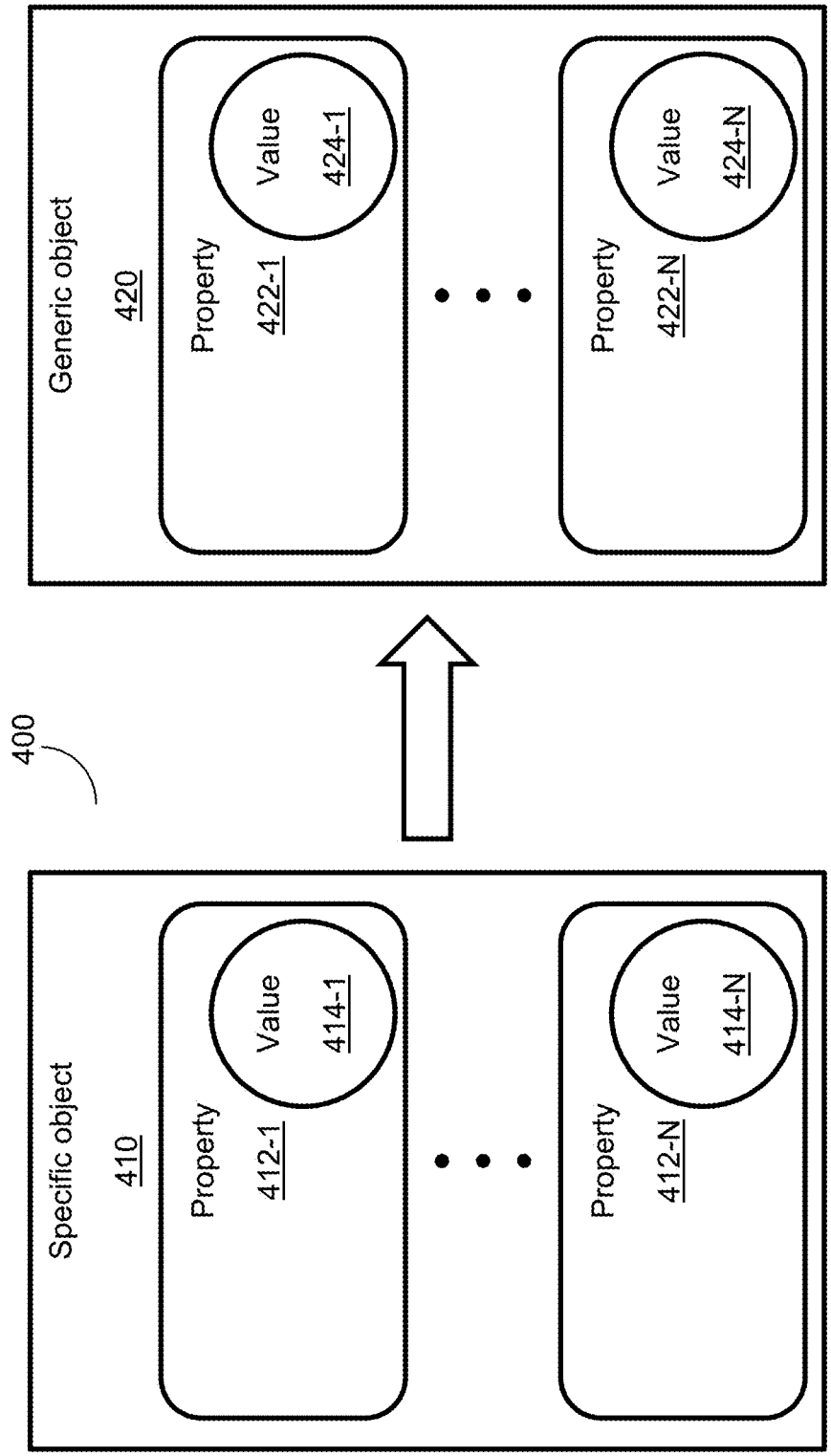
FIG. 4 is an illustration of the genericization of a network entity, utilized to describe the various embodiments.

FIG. 4 is an illustration 400 of the genericization of a network entity, utilized to describe the various embodiments. The illustration 400 includes a specific object 410 and a generic object 420, where the generic object corresponds to the specific object 410. The specific object is a network entity including one or more known properties 412-1 through 412-N (hereinafter referred to as "specific object property" 412 or "specific object properties" 412), where each specific object property 412 includes a value 414-1 through 414-N (hereinafter referred to as "specific object property value" 414 or "specific object property values). The generic object 420 is a network entity generated by one or more means, including, without limitation, the genericization processes described with respect to FIG. 2, above. The generic object 420 includes one or more properties 422-1 through 422-N (hereinafter referred to as "generic object property" 422 or "generic object properties" 422), where each generic object property 422 includes a value 424-1 through 424-N (hereinafter referred to as "generic object property value" 424 or "generic object property values" 424). As is applicable to the specific object properties 412, the specific object property values 414, the generic object properties 422, and the generic object property values 424, "N" is an integer having a value greater than one.

The genericization of an object, as depicted in the illustration 400, is the process of generating a generic object 420 from a specific object 410. The genericization of an object may be achieved using the method described with respect to FIG. 2, other, like, methods, and any combination thereof. The generated generic object 420 is a network entity having a type similar or identical to the type of the specific object 410 and including one or more generic object properties 422 similar or identical to the specific object properties 412. The generic object 420 may be generated according to one or more pre-defined or user-defined formats, schemas, templates, and the like, providing for inclusion of one or more generic object properties 422 for generic objects 420 of a given type. The generic object property values 424 may be values populated, during genericization, based on the corresponding specific object property values 414. Further, generic object property values 424 may be pre-defined or user-defined, such as in a template, schema, or the like, from which the generic object 420 is generated, providing for population of generic object property values 424 with one or more default or pre-configured values.

As an example, where a specific object 410 is genericized, such as during the execution of the method described with respect to FIG. 2, a generic object 420 may be generated during genericization. The generated generic object 420 may be of the same type as the specific object 410, such as, for example, a firewall entity. Where the generic object 420 is generated based on a template firewall entity, the generic object 420 may include one or more pre-configured generic object properties 422, such as, as examples and without limitation, firewall rules, firewall addresses, firewall port configurations, firewall connection configurations, and the like, as well as any combination thereof. During genericization, the generic object property values 424 may be populated based on the corresponding specific object property values 414, such as specific object 410 firewall rules, specific object 410 firewall addresses, specific object 410 firewall port configurations, specific object 410 firewall connection configurations, and the like. Where, according to the same example, the generic object 420 includes one or more generic object properties 422 corresponding to specific object properties 412 which are not defined in the specific object 410, or for which specific object property values 414 are not defined, genericization may include the population of generic object property values 424 with values pre-defined in the template or format from which the generic object 420 is generated.

Figure 5A:
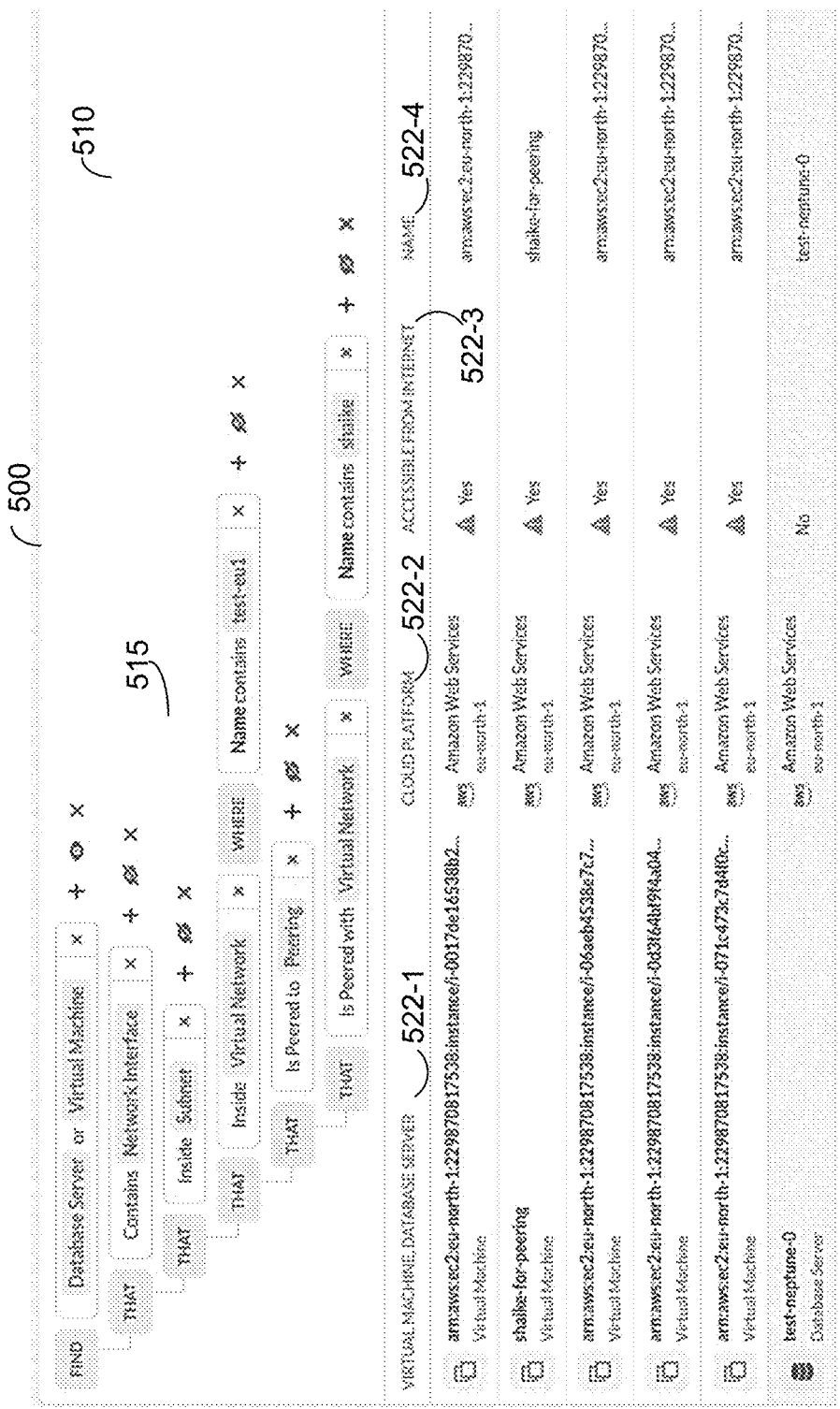
FIG. 5A is an interactive graph analysis platform, provided through a user interface (UI), according to an embodiment.

FIG. 5A is an example interactive graph analysis platform 500, provided through a user interface (UI), according to an embodiment. The example platform 500 provides for user interaction with one or more graph analysis tools through a user device configured to execute the UI, where such a user device may be, as examples and without limitation, a personal computer, a tablet computer, a smartphone, other, like, devices, as well as various combinations thereof. The example platform 500 includes a query construction pane 510, including a query construction tool 515, as well as a per-query unique return display 520, the per-query unique return display including several query return columns 522-1 through 522-4 (hereinafter, "query return column" 522 or "query return columns" 522).

The query construction pane 510 is a feature of a graph analysis platform, providing for display of the query construction tool 515. The query construction pane 510 may be of a fixed size relative to the graph analysis platform, or may, in an embodiment, be dynamically re-sized based on one or more factors including, without limitation, user re-size commands, automatic resizing based on the properties of the query construction tool, such as the number of queries included in a compound query constructed therein, as well as other, like, bases, and any combination thereof.

The query construction tool 515 is an interactive graph analysis tool, providing for user interaction with data included in a graph, such as graphs generated as described herein, on a visual basis. The query construction tool 515 may be configured to accept one or more inputs, which inputs may be, upon execution of a query by a graph analysis system, or other, similar, component, device, system, or the like, configured to provide various graph analysis functionalities, automatically translated into one or more graph-search queries, instructions, commands, or the like, providing for development of compound queries via the tool's 515 visual interface.

Graph-search queries, instructions, commands, or the like, are graph-specific functions providing for the identification of one or more entities, or other, similar graph elements, based on the various input parameters specified by a user via the tool 515. Graph-search queries, and the like, as are applicable to the automated retrieval of graph information based on input parameters, are queries, instructions, commands, and the like, generated and structured in one or more formats or languages specific to the structure or format of a graph, such as, as examples and without limitation, JavaScript Object Notation (JSON) queries, other, like, queries, and any combination thereof. Graph-search queries may be configured to accept one or more input parameters, to traverse one or more graphs and identify elements thereof matching the input parameters when executed by a graph analysis system or other, like, system, and to return the one or more identified graph elements. Graph search queries may be generated via one or more means including, without limitation, user-generation by development of specific queries in query formats, conversion of user input selections, such as through the query construction tool 515, into query formats, by other, like, means, and any combination thereof.

The query construction tool 515 may be configured to provide for user selection of one or more graph query criteria, including query criteria corresponding to designated query search and filter refinements. Query search refinements are top-layer query search criteria, providing for selection of one or more graph entities or elements matching one or more specifications, such specifications including, as an example and without limitation, a type of computing entities. Query filter refinements are lower-layer query search criteria, providing for selection of filtered graph entities or elements, from the group of entities or elements relevant to a given query search refinement, where such filtered graph entities or elements may be filtered on the basis of one or more factors or attributes including, without limitation, entity or element names, types, addresses, connection types, entity or element locations or groups, other, like, factors or attributes, and any combination thereof. The query construction tool 515 may be configured to provide for user generation of compound queries, wherein compound queries are queries including a search refinement and one or more filter refinements, providing for identification and selection of graph entities or elements including one or more properties or attributes, wherein such properties or attributes are those specified in the compound query.

The per-query unique return display 520 is an information pane configured to provide visual displays of graph information relevant to the query or queries generated via the query construction tool 515. The per-query unique return display is configured to automatically generate, upon return of graph information relevant to an executed graph query, one or more query return columns 522-1 through 522-4. The query return columns 522 are columns including information entries, wherein the information entries included in each column correspond with the various properties or attributes of one or more graph entities or elements returned in response to the execution of a graph query. Examples of query return columns, described by the columns' respective headers, include, without limitation, graph entity or element names, relevant cloud platforms, internet accessibility statuses, and the like, as well as any combination thereof.

Although only four query return columns 522-1 through 522-4 are shown in the example platform 500 for purposes of simplicity, it may be understood that one or more of such columns may be likewise relevant to an executed query without loss of generality or departure from the scope of the disclosure.

As an example, according to the platform 500 described with respect to FIG. 5A, a graph search query may be generated based on a user's selection of query inputs providing for a search for databases or virtual machines (VMs) which contain network interfaces, which are inside subnets, which are inside virtual networks with one or more user-specified names, which are connected to one or more peering connections, and which are peered to a virtual network with a specified name. Based on the identification of graph elements or entities including the attributes specified in the compound query developed through the query construction tool 515, the platform 500 may be configured to return a set of virtual machines and databases matching the described query, and to, through the per-query unique return display 520, display various attributes of each database or virtual machine identified.

Figure 5B:
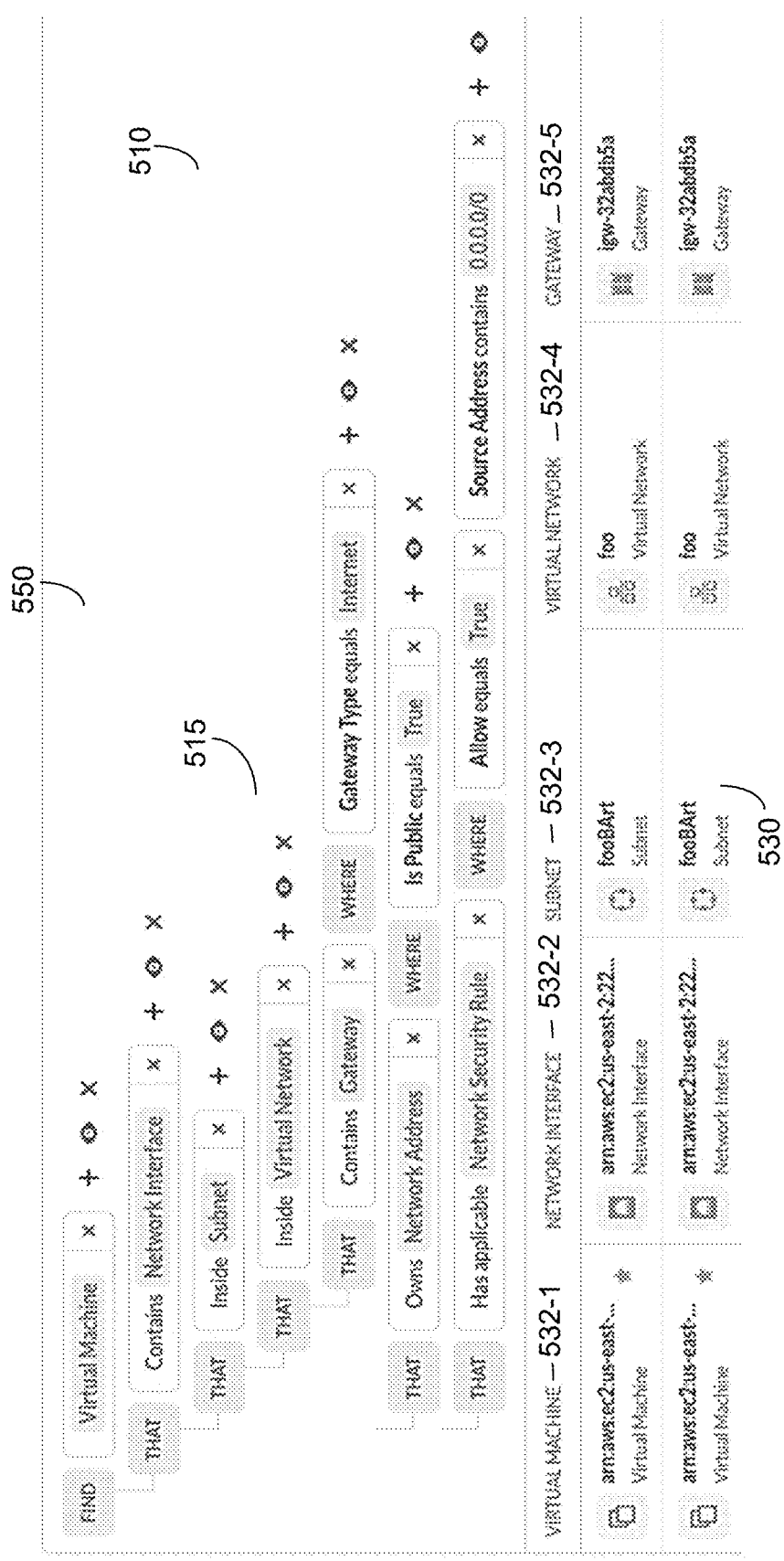
FIG. 5B is an interactive graph analysis platform, provided through a user interface (UI), according to an embodiment.

FIG. 5B is an example interactive graph analysis platform 550, provided through a user interface (UI), according to an embodiment. The example platform 550 provides for user interaction with one or more graph analysis tools through a user device configured to execute the UI, where such a user device may be, as examples and without limitation, a personal computer, a tablet computer, a smartphone, other, like, devices, as well as various combinations thereof. The example platform 550 includes a query construction pane 510, including a query construction tool 515, as well as a per-query unique return display 530, the per-query unique return display including several query return columns 532-1 through 532-5 (hereinafter, "query return column" 532 or "query return columns" 532).

The query construction pane 510 is a feature of a graph analysis platform, providing for display of the query construction tool 515. The query construction pane 510 may be of a fixed size relative to the graph analysis platform, or may, in an embodiment, be dynamically re-sized based on one or more factors including, without limitation, user re-size commands, automatic resizing based on the properties of the query construction tool, such as the number of queries included in a compound query constructed therein, as well as other, like, bases, and any combination thereof.

The query construction tool 515 is an interactive graph analysis tool, providing for user interaction with data included in a graph, such as graphs generated as described herein, on a visual basis. The query construction tool 515 may be configured to accept one or more inputs, which inputs may be, upon execution of a query by a graph analysis system, or other, similar, component, device, system, or the like, configured to provide various graph analysis functionalities, automatically translated into one or more graph-search queries, instructions, commands, or the like, providing for development of compound queries via the tool's 515 visual interface.

Graph-search queries, instructions, commands, or the like, are graph-specific functions providing for the identification of one or more entities, or other, similar graph elements, based on the various input parameters specified by a user via the tool 515. Graph-search queries, and the like, as are applicable to the automated retrieval of graph information based on input parameters, are queries, instructions, commands, and the like, generated and structured in one or more formats or languages specific to the structure or format of a graph, such as, as examples and without limitation, JavaScript Object Notation (JSON) queries, other, like, queries, and any combination thereof. Graph-search queries may be configured to accept one or more input parameters, to traverse one or more graphs and identify elements thereof matching the input parameters when executed by a graph analysis system or other, like, system, and to return the one or more identified graph elements. Graph search queries may be generated via one or more means including, without limitation, user-generation by development of specific queries in query formats, conversion of user input selections, such as through the query construction tool 515, into query formats, by other, like, means, and any combination thereof.

The query construction tool 515 may be configured to provide for user selection of one or more graph query criteria, including query criteria corresponding to designated query search and filter refinements. Query search refinements are top-layer query search criteria, providing for selection of one or more graph entities or elements matching one or more specifications, such specifications including, as an example and without limitation, a type of computing entity. Query filter refinements are lower-layer query search criteria, providing for selection of filtered graph entities or elements, from the group of entities or elements relevant to a given query search refinement, where such filtered graph entities or elements may be filtered on the basis of one or more factors or attributes including, without limitation, entity or element names, types, addresses, connection types, entity or element locations or groups, other, like, factors or attributes, and any combination thereof. The query construction tool 515 may be configured to provide for user generation of compound queries, wherein compound queries are queries including a search refinement and one or more filter refinements, providing for identification and selection of graph entities or elements including one or more properties or attributes, wherein such properties or attributes are those specified in the compound query.

The per-query unique return display 530 is an information pane configured to provide visual displays of graph information relevant to the query or queries generated via the query construction tool 515. The per-query unique return display is configured to automatically generate, upon return of graph information relevant to an executed graph query, one or more query return columns 532-1 through 532-5. The query return columns 532 are columns including information entries, wherein the information entries included in each column correspond with the various properties or attributes of one or more graph entities or elements returned in response to the execution of a graph query. Examples of query return columns, described by the columns' respective headers, include, without limitation, graph entity or element names, relevant network interfaces, relevant subnets, relevant virtual networks, relevant gateways, and the like, as well as any combination thereof.

Although only five query return columns 532-1 through 532-5 are shown in the example platform 550 for purposes of simplicity, it may be understood that one or more of such columns may be likewise relevant to an executed query without loss of generality or departure from the scope of the disclosure.

As an example, according to the platform 550 described with respect to FIG. 5B, a graph search query may be generated based on a user's selection of query inputs providing for a search for virtual machines (VMs) which contain network interfaces, which are inside subnets, which are inside virtual networks, which contain internet gateways, where the virtual network's network address is public, and where the virtual network includes a network security rule which specifies connection allowance for a given source address. Based on the identification of graph elements or entities including the attributes specified in the compound query developed through the query construction tool 515, the platform 550 may be configured to return a set of virtual machines matching the described query, and to, through the per-query unique return display 530, display various attributes of each virtual machine identified.

Figure 6:
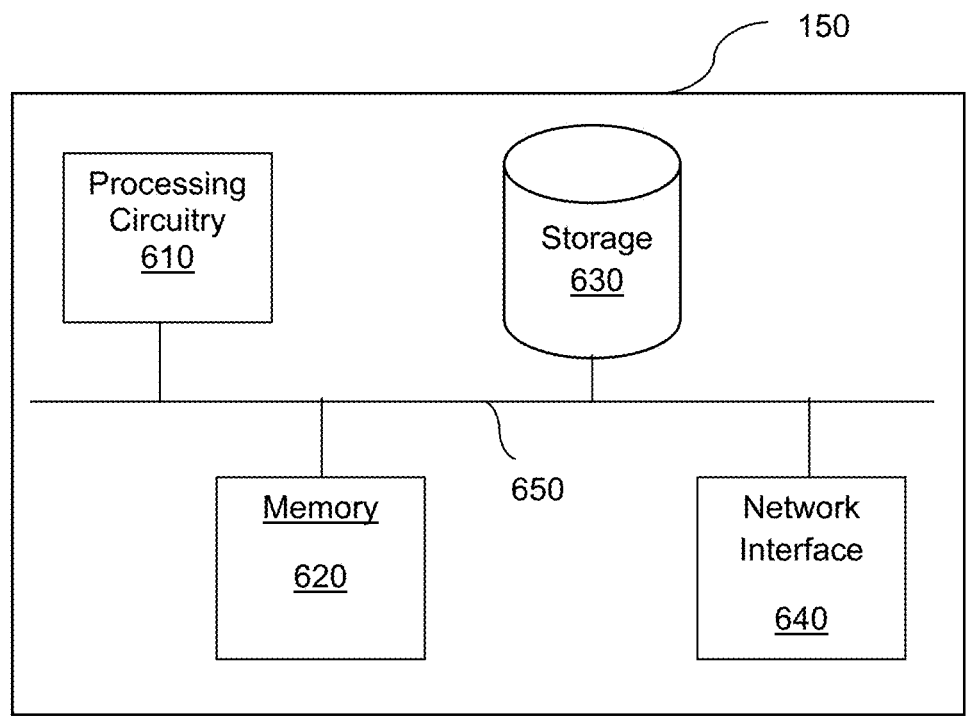
FIG. 6 is a hardware block diagram depicting a graph analysis system, according to an embodiment.

FIG. 6 is an example hardware block diagram 600 depicting a graph analysis system 150, according to an embodiment. The graph analysis system 150 includes a processing circuitry 610 coupled to a memory 620, a storage 630, and a network interface 640. In an embodiment, the components of the graph analysis system 150 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or another memory technology, compact disk-read only memory (CD-ROM), Digital Versatile Disks (DVDs), or any other medium which can be used to store the desired information.

The network interface 640 allows the graph analysis system 150 to communicate with the various components, devices, and systems described herein for generation of unified graph models for network entities, as well as other, like, purposes.

It should be understood that the embodiments described herein are not limited to the specific architecture illustrated in FIG. 6, and other architectures may be equally used without departing from the scope of the disclosed embodiments.

It should be noted that the computer-readable instructions may be construed broadly to mean any type of instructions, whether referred to as software, firmware, middleware, microcode, hardware description language, or otherwise. Instructions may include code, such as in source code format, binary code format, executable code format, or any other suitable format of code. The instructions, when executed by the circuitry, cause the circuitry to perform the various processes described herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units (CPUs), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method performed by processing circuitry for generation of unified graph models for network entities, comprising:

collecting, by the processing circuitry, for a network entity of a plurality of network entities, a network entity data feature, the network entity data feature including a network entity property;

genericizing, by the processing circuitry, the network entity based on the collected network entity data feature to generate a generic network entity;

generating, by the processing circuitry, an imputed entity, wherein the imputed entity corresponds to and represents a functionality identified in a cloud platform, wherein the identified functionality is not executed by a network entity of the plurality of network entities;

generating, by the processing circuitry, a network graph based on the generic network entity and the imputed entity, wherein the generated network graph is a multi-dimensional data structure providing a representation of the plurality of network entities and relations between the network entities of the plurality of network entities; and storing, by the processing circuitry, the generated network graph.

2. The method of claim 1, wherein the network entity property relates to any one of: a network entity type, a network entity class, a network entity category, a network entity configuration, and any combination thereof.

3. The method of claim 1, wherein genericizing the network entity further comprises:

generating a new generic network entity, wherein the new generic network entity includes a network entity property of the network entity.

4. The method of claim 1, wherein genericizing the network entity further comprises:

converting the network entity into a new generic network entity, wherein the new generic network entity includes a network entity property of the network entity.

5. The method of claim 1, wherein generating the imputed entity further comprises: identifying any one functionality of: a platform functionality, an environment functionality, and a combination thereof, wherein the identified functionality corresponds with a functionality of a generic network entity.

6. The method of claim 1, wherein the generated network graph includes a unified representation of the plurality of network entities.

7. The method of claim 1, wherein the generated network graph includes a unified representation of a plurality of environment layers.

8. The method of claim 1, wherein the generated network graph includes a graph vertex, wherein the graph vertex represents any one of: a network entity, a generic entity, and an imputed entity.

9. The method of claim 8, wherein the graph vertex includes a property label, wherein the property label includes a description of a property of the graph vertex.

10. The method of claim 8, wherein the generated network graph includes a graph edge, wherein the graph edge is a connection between two graph vertices, and wherein the graph edge represents a relationship between two connected entities, wherein a connected entity is any one of: a network entity, a generic entity, and an imputed entity.

11. The method of claim 10, wherein graph edge includes any one of: a property label, and a directionality indicator, wherein the property label includes a description of a property of the graph edge, and wherein the directionality indicator includes a description of a direction of the graph edge.

12. The method of claim 1, further comprising:
generating a visualization of the generated network graph.

13. The method of claim 1, wherein storing the generated network graph further comprises:
storing the generated network graph in a graph database.

14. The method of claim 1, wherein a network entity of the plurality of network entities includes any one of: a private endpoint, a transit gateway, a tag-based ruleset, an entity configured to implement a tag-based ruleset, a container-management service, a container-management application, a third-party container, a third-party image, a web-access firewall, a firewall implementation, a multi-entity connection, a cross-entity connection, a container manager, a container manager connection, and any combination thereof.

15. A non-transitory computer-readable medium storing a set of instructions for generation of unified graph models for network entities, the set of instructions comprising: one or more instructions that, when executed by one or more processors of a device, cause the device to:

collect, for a network entity of a plurality of network entities, a network entity data feature, the network entity data feature including a network entity property;

genericize the network entity based on the collected network entity data feature to generate a generic network entity;

generate an imputed entity, wherein the imputed entity corresponds to and represents a functionality identified in a cloud platform, wherein the identified functionality is not executed by a network entity of the plurality of network entities;

generate a network graph based on the generic network entity and the imputed entity, wherein the generated network graph is a multi-dimensional data structure providing a representation of the plurality of network entities and relations between the network entities of the plurality of network entities; and store the generated network graph.

16. A system for generation of unified graph models for network entities comprising: a processing circuitry;

a memory, the memory containing instructions that, when executed by the processing circuitry, configure the system to: collect, for a network entity of a plurality of network entities, a network entity data feature, the network entity data feature including a network entity property;

genericize the network entity based on the collected network entity data feature to generate a generic network entity;

generate an imputed entity, wherein the imputed entity corresponds to and represents a functionality identified in a cloud platform, wherein the identified functionality is not executed by a network entity of the plurality of network entities;

generate a network graph based on the generic network entity and the imputed entity, wherein the generated network graph is a multi-dimensional data structure providing a representation of the plurality of network entities and relations between the network entities of the plurality of network entities; and store the generated network graph.

17. The system of claim 16, wherein the network entity property relates to any one of:

a network entity type, a network entity class, a network entity category, a network entity configuration, and any combination thereof.

18. The system of claim 16, wherein the memory contains further instructions that, when executed by the processing circuitry for genericizing the network entity, further configure the system to:

generate a new generic network entity, wherein the new generic network entity includes a network entity property of the network entity.

19. The system of claim 16, wherein the memory contains further instructions that, when executed by the processing circuitry for genericizing the network entity, further configure the system to:
convert the network entity into a new generic network entity, wherein the new generic network entity includes a network entity property of the network entity.

20. The system of claim 16, wherein the memory contains further instructions that, when executed by the processing circuitry for generating the imputed entity, further configure the system to: identify any one functionality of: a platform functionality, an environment functionality, and a combination thereof, wherein the identified functionality corresponds with a functionality of a generic network entity.

21. The system of claim 16, wherein the generated network graph includes a unified representation of the plurality of network entities.

22. The system of claim 16, wherein the generated network graph includes a unified representation of a plurality of environment layers.

23. The system of claim 16, wherein the generated network graph includes a graph vertex, the graph vertex represents any one of:
a network entity, a generic entity, and an imputed entity.

24. The system of claim 23, wherein the graph vertex includes a property label, the property label includes a description of a property of the graph vertex.

25. The system of claim 23, wherein the generated network graph includes a graph edge, the graph edge is a connection between two graph vertices, and the graph edge represents a relationship between two connected entities, a connected entity is any one of:
a network entity, a generic entity, and an imputed entity.

26. The system of claim 25, wherein graph edge includes any one of:
a property label, and a directionality indicator, wherein the property label includes a description of a property of the graph edge, and wherein the directionality indicator includes a description of a direction of the graph edge.

27. The system of claim 16, wherein the memory contains further instructions which when executed by the processing circuitry further configure the system to:
generate a visualization of the generated network graph.

28. The system of claim 16, wherein the memory contains further instructions that, when executed by the processing circuitry for storing the generated network graph, further configure the system to:
store the generated network graph in a graph database.

* * * * *